United States Patent
Goto et al.

(10) Patent No.: US 6,820,437 B2
(45) Date of Patent: Nov. 23, 2004

(54) AIR CONDITIONER

(75) Inventors: Naomi Goto, Shiga (JP); Nobuyuki Nishii, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/466,662

(22) PCT Filed: Nov. 26, 2002

(86) PCT No.: PCT/JP02/12312
§ 371 (c)(1),
(2), (4) Date: Jul. 18, 2003

(87) PCT Pub. No.: WO03/047894
PCT Pub. Date: Jun. 12, 2003

(65) Prior Publication Data
US 2004/0074255 A1  Apr. 22, 2004

(30) Foreign Application Priority Data
Dec. 6, 2001  (JP) .................... 2001-372286

(51) Int. Cl.[7] .............................. F25B 27/00
(52) U.S. Cl. ............................ 62/236; 62/498
(58) Field of Search ............... 62/236, 498, 230; 174/102 R, 113 R

(56) References Cited

U.S. PATENT DOCUMENTS

| | | | |
|---|---|---|---|
| 4,292,469 A | * 9/1981 | Scott et al. | 704/208 |
| 5,357,757 A | * 10/1994 | Lucas | 62/6 |
| 5,737,933 A | * 4/1998 | Idei et al. | 62/141 |
| 5,838,877 A | * 11/1998 | Elliot et al. | 388/804 |
| 6,094,927 A | * 8/2000 | Anazawa et al. | 62/239 |
| 6,142,741 A | * 11/2000 | Nishihata et al. | 417/32 |
| 6,220,380 B1 | * 4/2001 | Mita et al. | 180/65.1 |
| 6,315,527 B1 | * 11/2001 | Makino et al. | 417/410.1 |
| 6,591,924 B2 | * 7/2003 | Shimizu | 180/65.1 |
| 6,687,139 B2 | * 2/2004 | Tanikawa et al. | 363/37 |

FOREIGN PATENT DOCUMENTS

| | | | |
|---|---|---|---|
| JP | 07-304327 A | | 11/1995 |
| JP | 09079711 A | * | 3/1997 |
| JP | 10018646 A | * | 1/1998 |
| JP | 10-193956 A | | 7/1998 |
| JP | 11-213775 A | | 8/1999 |
| JP | 3064139 Y2 | | 9/1999 |
| JP | 2002-165466 A | | 6/2002 |

OTHER PUBLICATIONS

Japanese International Search Report for PCT/JP02/12312, dated Mar. 11, 2003.

* cited by examiner

*Primary Examiner*—William Doerrler
*Assistant Examiner*—Mohammad M. Ali
(74) *Attorney, Agent, or Firm*—RatnerPrestia

(57) ABSTRACT

An air conditioner includes a direct-current (DC) power supply, a compressor, and a compressor driving device that converts a current supplied from the DC power supply into an alternate-current (AC) for driving the compressor. The DC power supply energizes the driving device through a center conductor and an outer conductor of a shield cable. This structure allows the driving device not to include a capacitor for smoothing a power current, and to suppress surge voltages and electromagnetic-wave radiation, thus providing an air-conditioner including a compact size and light-weighted compressor driving device.

13 Claims, 21 Drawing Sheets

AIR CONDITIONER

This Application is a U.S. National Phase Application of PCT International Application PCT/JP02/12312.

TECHNICAL FIELD

The present invention relates to an air conditioner equipped with an electric compressor and an electric compressor driving device.

BACKGROUND ART

A conventional electric compressor driving device used in a car is described hereinafter with reference to drawings. FIG. 15(a) shows a perspective view illustrating an appearance of an electric compressor driving device. Case 24 made of metal has a waterproof construction and accommodates the device. Coupling-line output port 47 which has also a waterproof structure and is mounted to case 24 passes coupling line 55 therethrough. Coupling line 55 includes two wires coupled to a battery, e.g., a direct-current (DC) power supply of approximately 300V, three wires coupled to an electric compressor, two wires coupled to a 12V power supply, and three wires carrying controlling signals and coupled to an air-conditioner controller.

In case 24, an inverter circuit converting a current from the battery into an alternate-current (AC) current is located. This inverter circuit generates heat due to DC/AC converting loss. This heat dissipates into cooling water running through water-cooling tube 56 mounted to case 24. The heat dissipation is not limited to the water cooling method, but an air cooling method can be used.

The above construction allows the electric compressor driving device to be placed in a car with few restrictions, so that the driving device can be disposed at a place away from the power supply, the battery.

FIG. 15(b) illustrates the inside of case 24 of the electric compressor driving device. Circuit board 57 having electric components mounted thereon and electrolytic capacitor 41 are located in case 24. Capacitor 41 is generally used as a power-current smoothing capacitor for smoothing the current supplied from the battery to the inverter circuit. An outline of the appearance is shown as line 53.

FIG. 16 shows a perspective view illustrating circuit board 57 shown in FIG. 15(b) and its related components. Circuit board 57 is coupled to an inverter circuit 54 as an inverter block which generates a heat greater than other components, so that inverter circuit 54 is mounted to a cooling structure related to water-cooling tube 56.

FIG. 17 shows a circuit diagram of the electric compressor driving device.

As shown in the drawing, battery 1 is coupled to compressor driving device 5 as a power supply through current-carrying device 2. Compressor driving device 5 includes inverter circuit 9 and electrolytic capacitor 41 for smoothing the current supplied from battery 1 to inverter circuit 9.

Inverter circuit 9 is coupled to a load, i.e., electric compressor 23. Current-carrying device 2 charges electrolytic capacitor 41 through charging resistor 10 up to a voltage of battery 1, and then closes main relay 11 for passing the current from battery 1 to inverter circuit 9. Current-carrying device 2 may be built in compressor driving device 5.

A voltage supplied from battery 1 to compressor driving device 5 is divided by upper bleeder resistor 13 and lower bleeder resistor 14, is insulated by voltage detector 16, and is then fed into inverter controlling microprocessor 19. The current passing through inverter circuit 9 is detected by current sensor 15, is insulated by current detector 17, and is fed into inverter controlling microprocessor 19.

Air-conditioner controller 21 calculates a capacity (such as a rotation speed) of compressor 23 necessary for an air-conditioner, and the capacity is input to microprocessor 19 via communication circuit 20.

Inverter controlling microprocessor 19 sends signals to gate driver 18 based on at least the inputs, thereby activating switching elements of inverter circuit 9 for driving compressor 23.

Gate driver 18 electrically insulates inverter circuit 9 from microprocessor 19. Inverter controlling microprocessor 19 receives sequential temperature data supplied from a thermistor temperature sensor of compressor 23. Switching power supply 12 produces a power for gate driver 18 and others. Current sensor 15 includes a current-carrying coil having an inductance component. This coil produces magnetic field detected by a Hall element, so that a current is determined.

This is not shown in the drawings, but a traction motor driving device is coupled to compressor driving device 5 in parallel, and current-carrying device 2 works similarly on a current-smoothing capacitor and an inverter circuit both equipped to the traction motor driving device.

12V power supply 22 is used as a power supply mainly for inverter controlling microprocessor 19 and communication circuit 20. 12V power supply 22 is also used as a power supply for many electric devices, such as air-conditioner controller 21, audio equipment, and a navigation system. 12V power supply 22 is electrically insulated from battery 1; and is however powered from battery 1 via a DC converter (not shown).

FIG. 18(a) shows a current flowing into inverter circuit 9, and FIG. 18(b) shows a current flowing into compressor driving device 5.

The waveform of the current flowing into inverter circuit 9 is like a rectangular wave. The waveform of the current flowing into compressor driving device 5 includes a constant current although having ripples due to the current flowing into inverter circuit 9 smoothed by electrolytic capacitor 41. Actual waveforms are more complicated, and FIG. 18 shows just outlines. As shown in FIG. 18(c), a DC voltage of battery 1 is applied to inverter circuit 9.

FIG. 19 is a schematic diagram of electric compressor 23 shown in FIG. 17. Compressor 23 includes metallic case 8 accommodating compressing mechanism 4 and motor 7. Refrigerant is sucked from intake 45, and motor 7 drives compressing mechanism 4 (a scroll compressing mechanism), so that the refrigerant is compressed.

The compressed refrigerant cools motor 7 before being discharged from outlet 46. Terminal 27 coupled to a winding of motor 7 in compressor 23 is connected to compressor driving device 5 shown in FIG. 17.

Electrolytic capacitor 41 discussed above has a large size to increase the size of the compressor driving device and to make the driving device heavy. Electrolytic capacitor 41 is vulnerable to vibrations and heat, thus preventing the compressor driving device from having an improved vibration proof and heat resistance.

A vehicle having a limited space, such as a compact electric vehicle and a hybrid electric vehicle, requires small components mounted in the vehicle. Further, the hybrid electric vehicle has a smaller space since having a space for an engine. Thus, no electrolytic capacitor 4 be mounted in the vehicle is proposed, but the following problems occur in this case.

The current supplied from battery 1 to inverter circuit 9 would not be smoothed without electrolytic capacitor 41. Then, the current of rectangular waveform passing through a power supply lead wire radiates electromagnetic-wave noises. As a result, a surge voltage is generated in the power supply lead wire, thereby damaging the circuit of compressor driving device 5.

FIG. 20 shows a circuit diagram in which electrolytic capacitor 41 is excluded (detailed structure is omitted). The case and junction connectors lengthen the power supply lead wire, so that a large and unstable inductance component 58 is generated in the lead wire.

Since the current is not smoothed by electrolytic capacitor 41 shown in FIG. 17, the current shown in FIG. 21(a) and flowing into inverter circuit 9 passes through the power supply lead wire. This current passes through inductance component 58, so that surge occurs as shown in FIG. 21(c) when the current is turned off.

This surge has a high voltage and may damage inverter circuit 9. Electrolytic capacitor 41 shortens the path for the current flowing into inverter circuit 9 just between capacitor 41 and circuit 9, so that the inductance between capacitor 41 and circuit 9 is small enough not to generate surge as shown in FIG. 18(c).

The current shown in FIG. 21(b) has a high frequency component, and the power supply lead wire radiates electromagnetic wave noises when this current passing through the wire.

The present invention addresses the foregoing problems, and aims to provide an air-conditioner equipped with a reliable electric compressor driving device which has a small size and light weight and does not generate electromagnetic noises or a surge voltage.

SUMMARY OF THE INVENTION

In order to solve the foregoing problems, an air conditioner according to the present invention includes a direct-current (DC) power supply, an electric compressor, and an electric compressor driving device that converts the current supplied from the DC power supply into an alternate-current (AC) current for driving the compressor. A center conductor and an outer conductor of a shield cable is used for feeding a current from the DC power supply to the electric compressor driving device.

This configuration cancels a magnetic field produced by a current flowing through the center conductor of shield cable and another magnetic field produced by a current flowing through the outer conductor since the center conductor and the outer conductor share the center axis.

Therefore, the cable has an inductance of substantially zero, thus allowing the driving device to suppressing a surge voltage and a radiated electromagnetic wave without an electrolytic capacitor.

DESCRIPTION OF PREFERRED EMBODIMENTS

An air conditioner according to exemplary embodiments of the present invention will be described hereinafter with reference to the accompanying drawings.

(Exemplary Embodiment 1)

Figure 1:
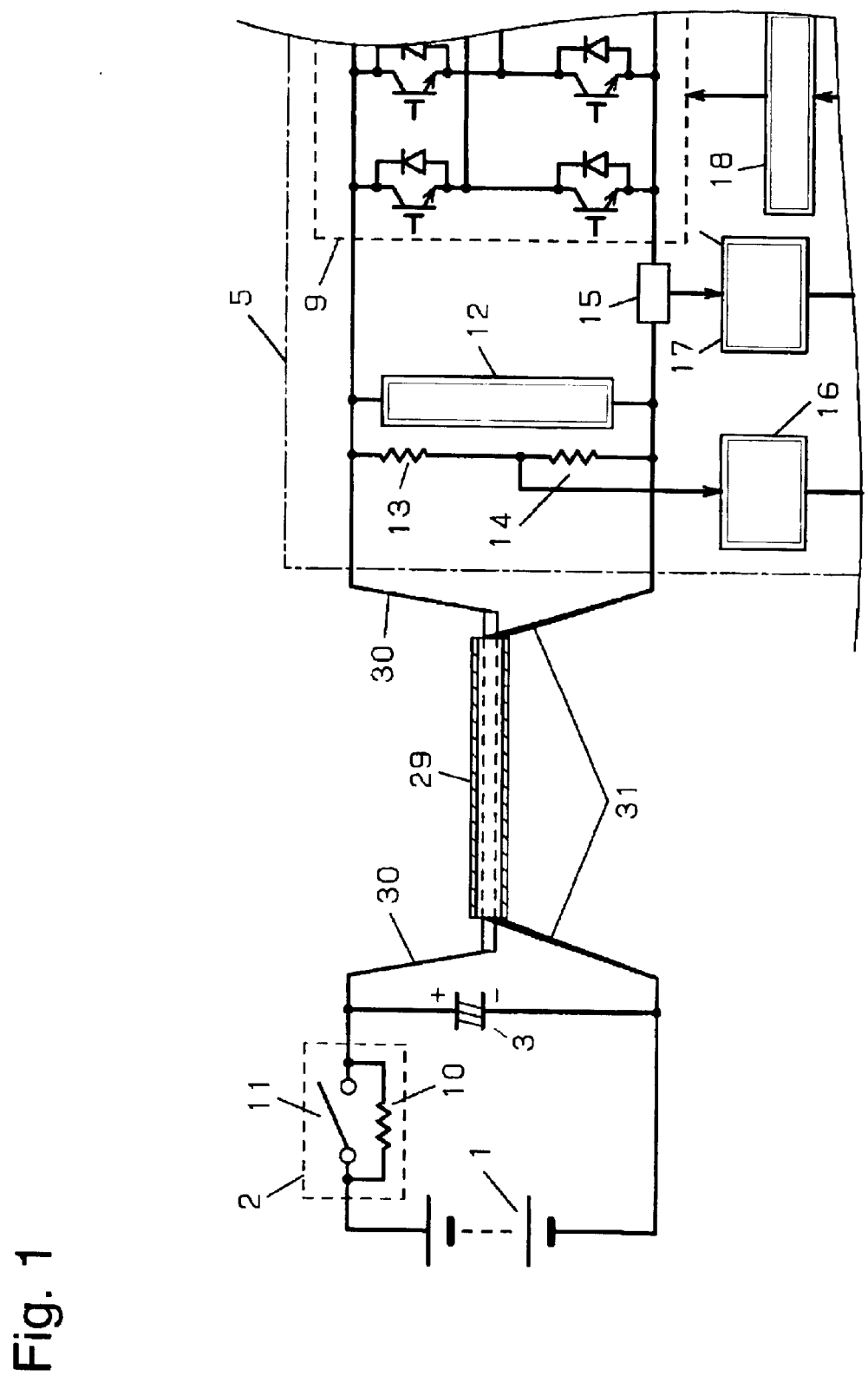
FIG. 1 is a circuit diagram of an essential part of an air-conditioner in accordance with exemplary embodiment 1 of the present invention.
Figure 17:
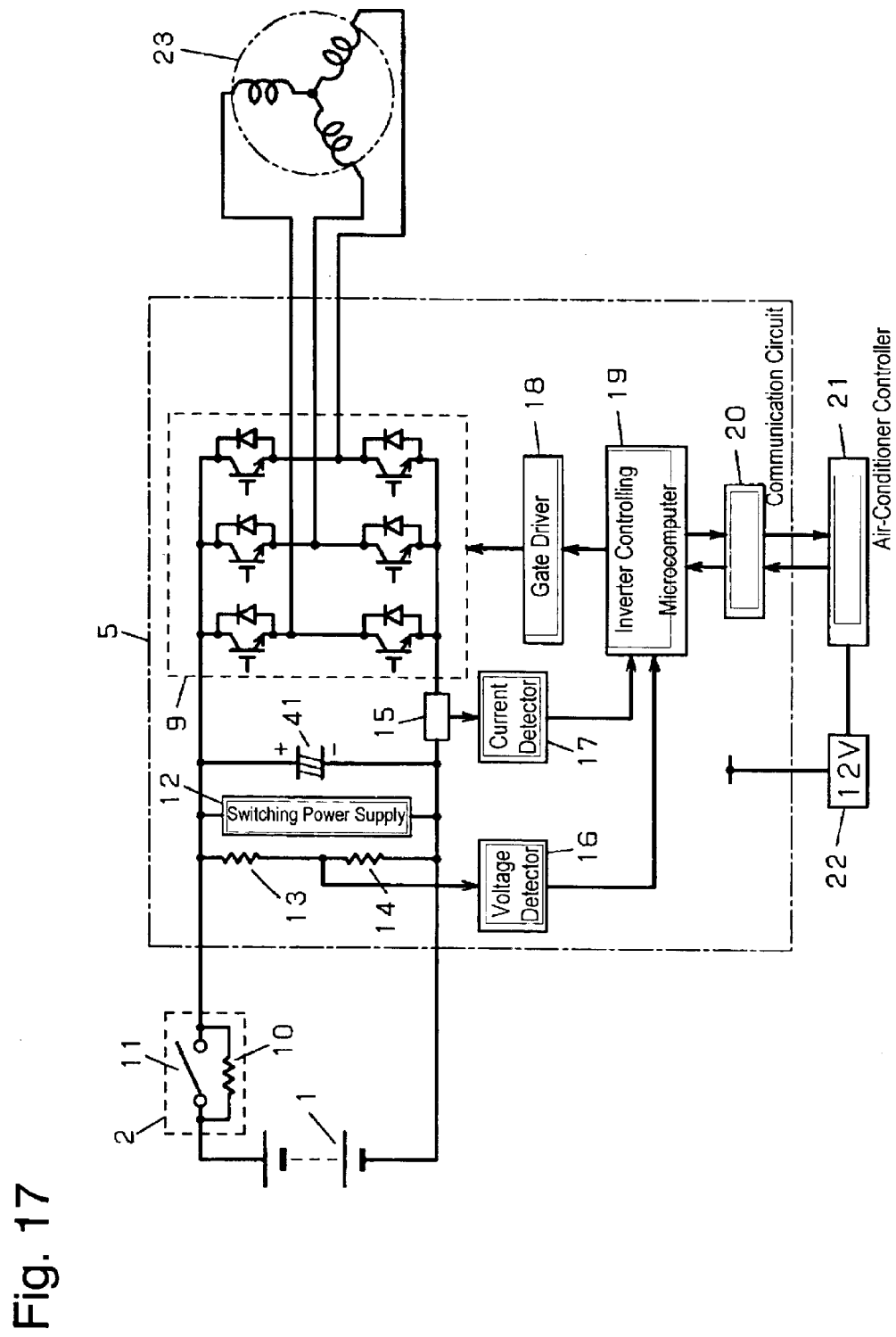
FIG. 17 shows essential parts of a circuit diagram including the electric compressor driving device.
Figure 18:
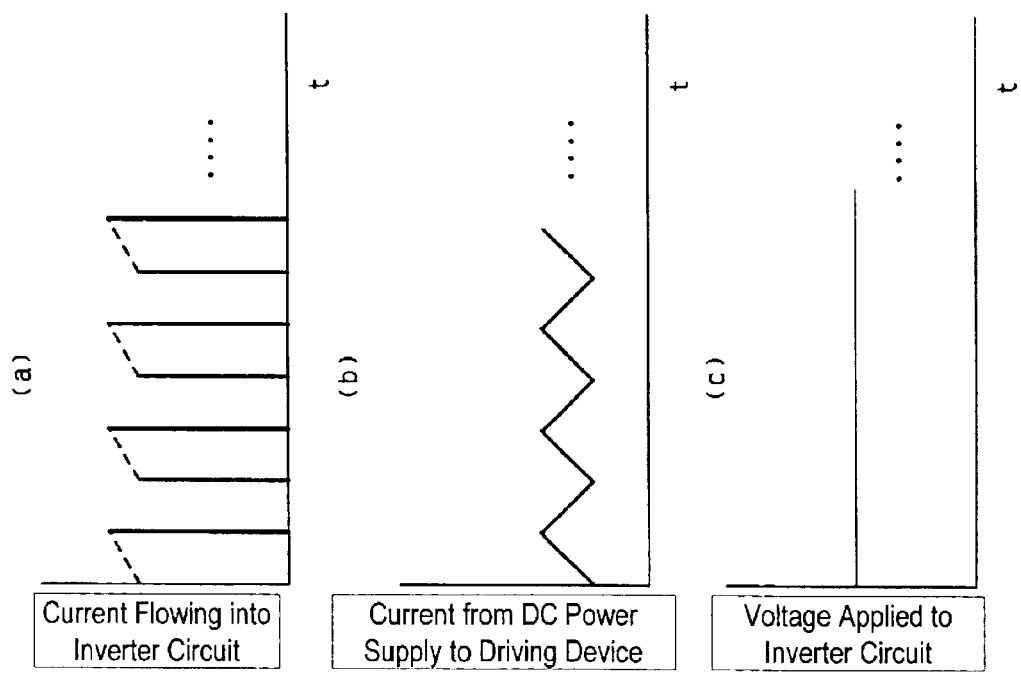
FIG. 18(a) shows a waveform of a current flowing into an inverter circuit of the electric compressor driving device.
FIG. 18(b) shows a waveform of a current flowing into the electric compressor driving device.
FIG. 18(c) shows a waveform of a voltage applied to the inverter circuit of the electric compressor driving device.

FIG. 1 is a circuit diagram of an electric compressor driving device. As shown in FIG. 1, the power supply lead wire is formed of a single shield cable 29 and electrolytic capacitor 41 is excluded, and electrolytic capacitor 3 is however located at a side of battery 1. Those points are different from the conventional circuit shown in FIG. 17.

If a power-supply impedance of battery 1 is small enough, no electrolytic capacitor 3 is needed. In shield cable 29, center conductor 30 is assigned to a positive side, and outer conductor 31 is assigned to a negative side.

Figure 2:
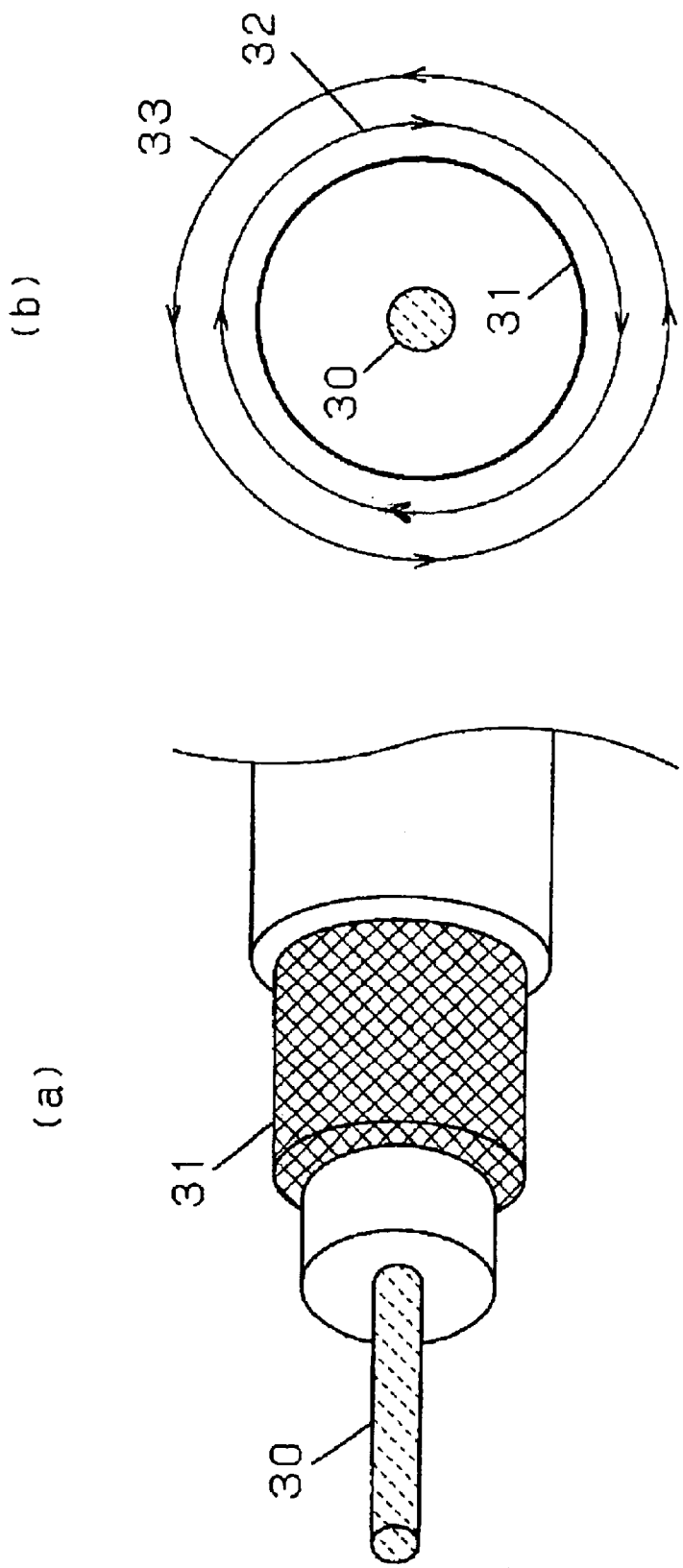
FIG. 2(a) illustrates a structure of a shield cable used in the circuit.
FIG. 2(b) shows directions of magnetic field in the shield cable used in the circuit.

FIG. 2(a) illustrates a construction of shield cable 29 and outer conductor 31 surrounds center conductor 30. FIG. 2(b) shows directions of magnetic field of shield cable 29. Since the direction of the current flowing through center conductor 30 is opposite to the direction of the current flowing through outer conductor 31, magnetic field 32 produced by the current through center conductor 30 cancels magnetic field 33 produced by the current through outer conductor 31. Electromagnetic wave is thus not radiated, and inductance of shield cable 29 becomes small.

Figure 3:
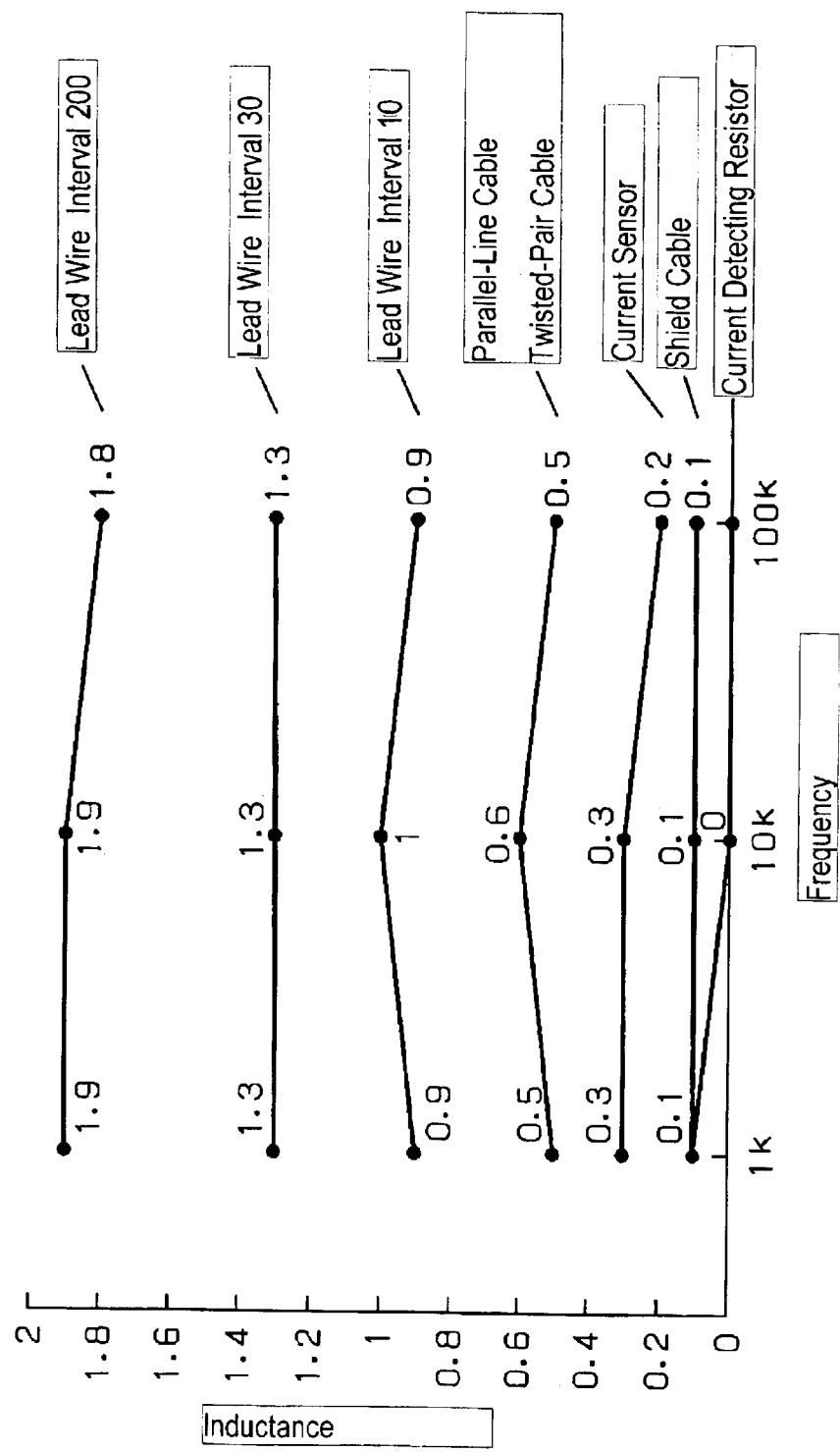
FIG. 3 is a graph indicating inductances of portions of the circuit.

The graph of FIG. 3 shows inductance values of wires and components. The inductances are measured for the same connected length of the wires. Two lead wires of 1 m, a shield cable, a parallel-line cable, a twisted-pair cable of 1 m are prepared. The inductances are measured in $\mu H$. The lead wire has a larger inductance, and the inductance varies depending on an interval between the lead wires. The interval of 200 mm provides the inductance of 1.8 $\mu H$. A closer interval (equivalent to the parallel-line cable) provides an inductance of 0.5 $\mu H$, thus having a difference of 3.6 times. Therefore, the lead wire causes the inductances to be a difficulty of specified, so that a reliable design is not obtainable.

The shield cable exhibits a small inductance. In the shield cable, the distance between center conductor 30 and outer conductor 31 stays constant, so that the inductance can be specified and a reliable design can be achieved. A parallel connection of a number "n" of the shield cables reduces the total inductance to 1/n.

Figure 15:
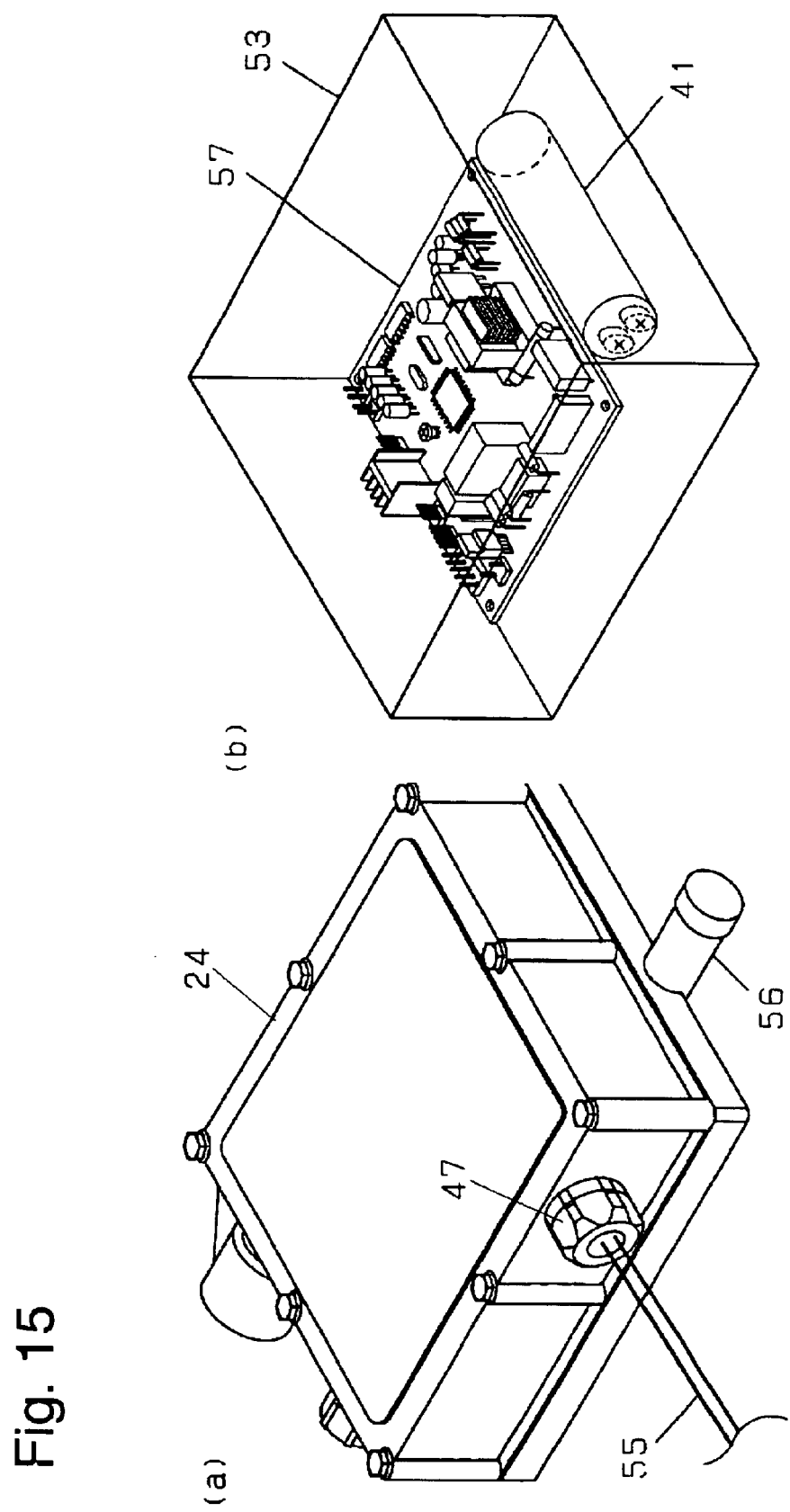
FIG. 15(a) shows a perspective view illustrating an appearance of an electric compressor driving device of a conventional air conditioner.
FIG. 15(b) shows a perspective view illustrating the inside of the electric compressor driving device.
Figure 16:
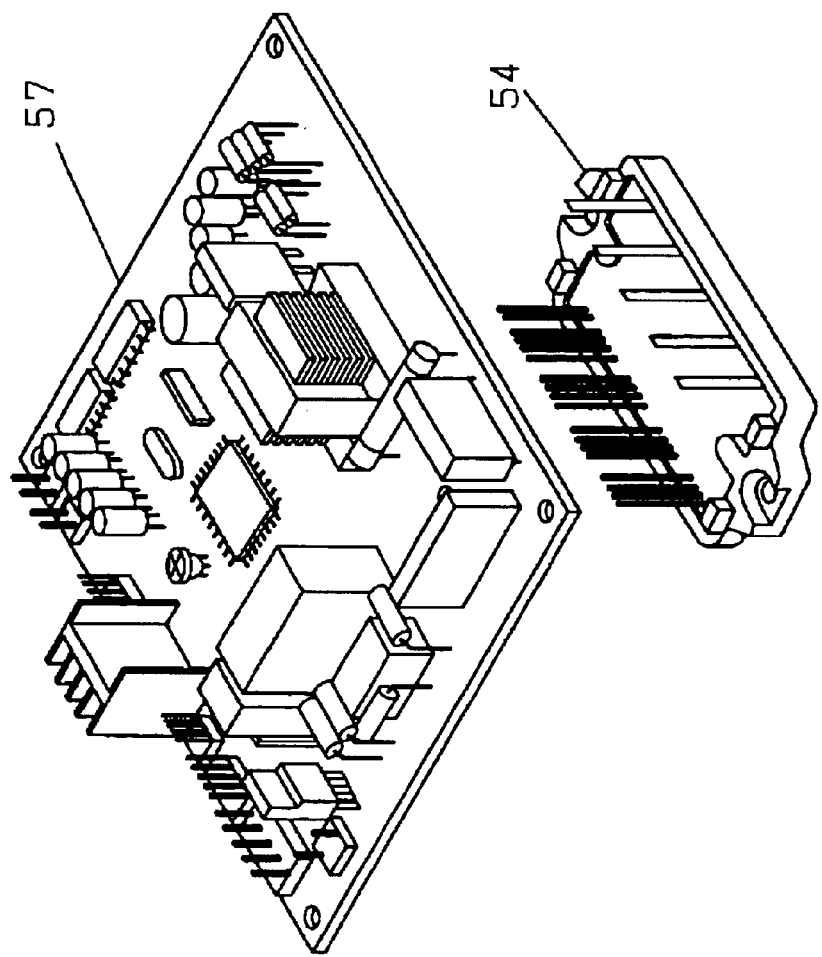
FIG. 16 shows an exploded perspective view for illustrating a circuit board and its related components in the electric compressor driving device.

In the conventional circuit shown in FIG. 15, the connecting wires between inverter circuit 54 and electrolytic capacitor 41 exhibit an inductance of 0.9 $\mu H$ at an interval of 10 mm and a length of 20 cm. If the connecting wires are replaced with a shield cable (0.1 $\mu H$), the shield cable can extend up to 180 cm at which the inductance reaches the same value (0.9 $\mu H$).

In the case that electrolytic capacitor 41 is excluded and electrolytic capacitor 3 is located at a side of battery 1, the distance between inverter circuit 54 and electrolytic capacitor 3 can extend up to 180 cm.

Since the shield cable is a single line, the cable can be handled easier than the two lead wires, and the shield cable can be bent flexibly, so that the shield cable allows to be located more flexibly than a bus-bar (an elongated metal strip).

FIG. 4(a) shows a perspective view illustrating the appearance of an electric compressor driving device, and FIG. 4(b) shows a perspective view of the inside the electric compressor driving device.

Since the driving device does not include electrolytic capacitor 41, case 26 can be smaller than conventional case 24 shown in FIG. 15(a). A connecting wire 51 includes one shield cable coupled to battery 1, three wires coupled to an electric compressor, and three wires for carrying control signals to an air-conditioner controller. The connecting wires are taken out from outlet 47 in a water-proof structure. Reference numeral 56 denotes a water-cooling tube mounted to case 26, and circuit board 57 is placed in case 26.

Since switching power supply 12 located in the driving device 5 produces a voltage of 12V (described later referring to FIG. 6), connecting wire 51 does not include two wires coupled to a 12V power supply.

Figure 5:
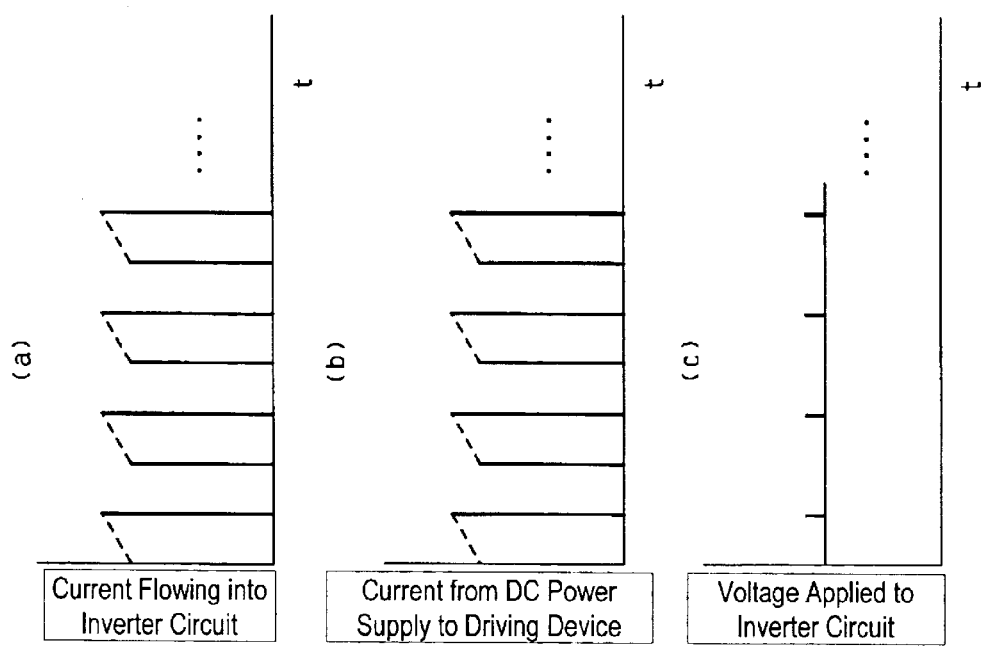
FIG. 5(a) shows a waveform of a current flowing into an inverter circuit of the electric compressor driving device.
FIG. 5(b) shows a waveform of a current flowing into the electric compressor driving device.
FIG. 5(c) shows a waveform of a voltage applied to the inverter circuit of the electric compressor driving device.
Figure 21:
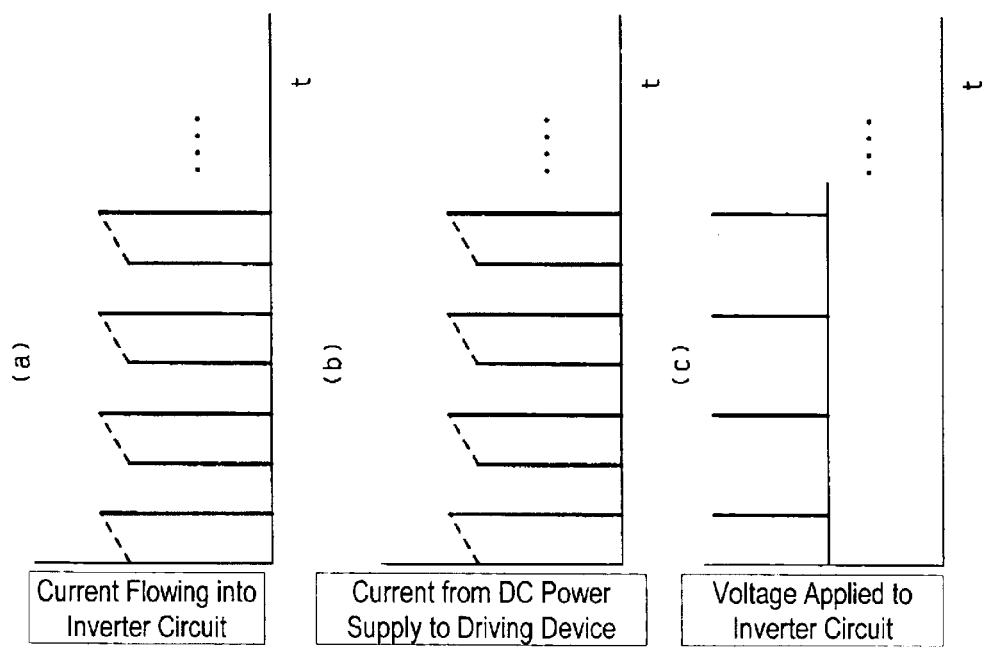
FIG. 21(a) shows a waveform of a current flowing into an inverter circuit of the electric compressor driving device.
FIG. 21(b) shows a waveform of a current flowing into the electric compressor driving device.
FIG. 21(c) shows a waveform of a voltage applied to the inverter circuit of the electric compressor driving device.

FIG. 5(a) shows a current flowing into inverter circuit 9. The current is similar to that of the conventional circuit. FIG. 5(b) shows a current flowing into the compressor driving device. This current is different from that of the conventional circuit since the current is not smoothed due to no electrolytic capacitor 41, and thus the current is similar to that shown in FIG. 5(a). FIG. 5(c) shows a voltage applied to inverter circuit 9. The inductance of shield cable 29 is smaller than that of the conventional circuit. Therefore, under the condition of the same length of the lead wires between inverter circuit 54 and electrolytic capacitor 3, a surge voltage shown in FIG. 5(c) is substantially proportionate to the inductance, thus becoming smaller than that of the conventional circuit shown in FIG. 21(c).

(Exemplary Embodiment 2)

Figure 6:
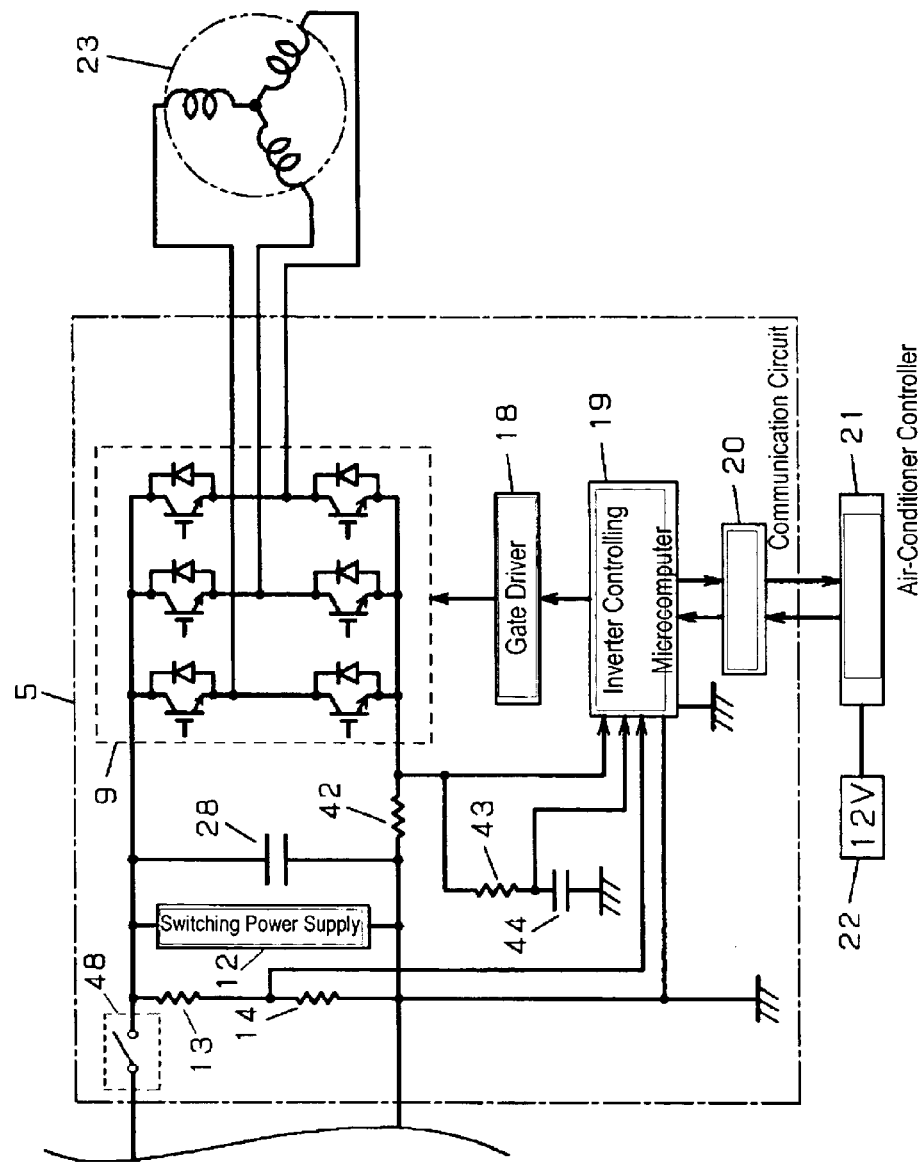
FIG. 6 is a circuit diagram of an essential part of an air-conditioner in accordance with exemplary embodiment 2 of the invention.

FIG. 6 shows an electric circuit of an electric compressor driving device. This driving device differs from that shown in FIG. 1 in the following points: Current sensor 15, voltage detector 16, and current detector 17 are deleted from the device shown in FIG. 1, and current detecting resistor 42, integrating resistor 43, integrating capacitor 44, sub-relay 48, and film capacitor 28 are added instead. 12V power supply 22 is not connected to driving device 5.

Inverter controlling microprocessor 19, which has been powered by 12V power supply 22 in FIG. 1, is powered by switching power supply 12 instead. Microprocessor 19 shares a ground with battery 1. Communication circuit 20 communicates with air-conditioner controller 21 in an insulated condition with a photo-coupler. A voltage divided by upper bleeder resistor 13 and lower bleeder resistor 14 can be directly fed into microprocessor 19.

A detected current can be directly fed into microprocessor 19 using a voltage generated across current-detecting resistor 42 (shunt resistor). The detected current is used as protection-halt signal, so that it may not be input to microprocessor 19, but it may be processed in a hardware-circuit.

When an average of the detected current is needed, a value integrated by integrating resistor 43 and integrating capacitor 44 may be directly input to microprocessor 19. As shown as inductances of wires and components in FIG. 3, the inductance of current-detecting resistor 42 (shunt resistor) is close to zero (0), so that a surge voltage can be reduced more than that of the circuit with current sensor 15.

Figure 8:
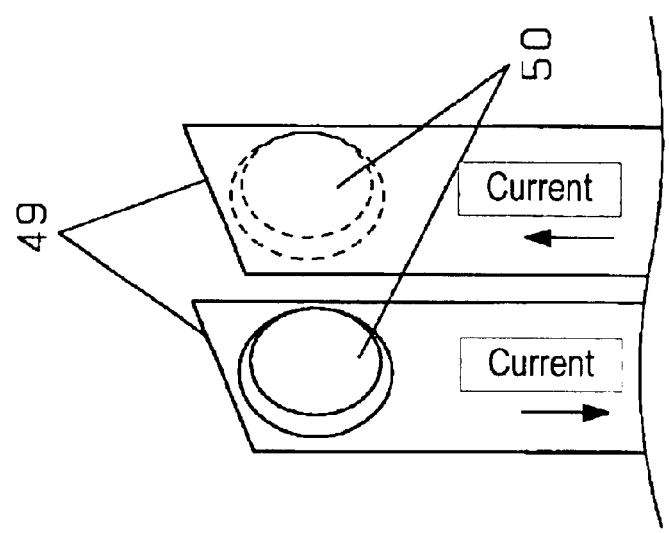
FIG. 8 shows a perspective view of essential parts of a relay contact of the electric compressor driving device.

FIG. 8 shows a construction of a relay contact of sub-relay 48 provided to a power supply line. Parallel flat relay-contact plates 49 face each other (sub-relay contact 50 is placed at upper side). This configuration allows currents flowing in opposite directions to cancel the magnetic fields, thus suppressing the inductance to a small value.

Next, an operation of film capacitor 28 is described hereinafter.

Figure 7:
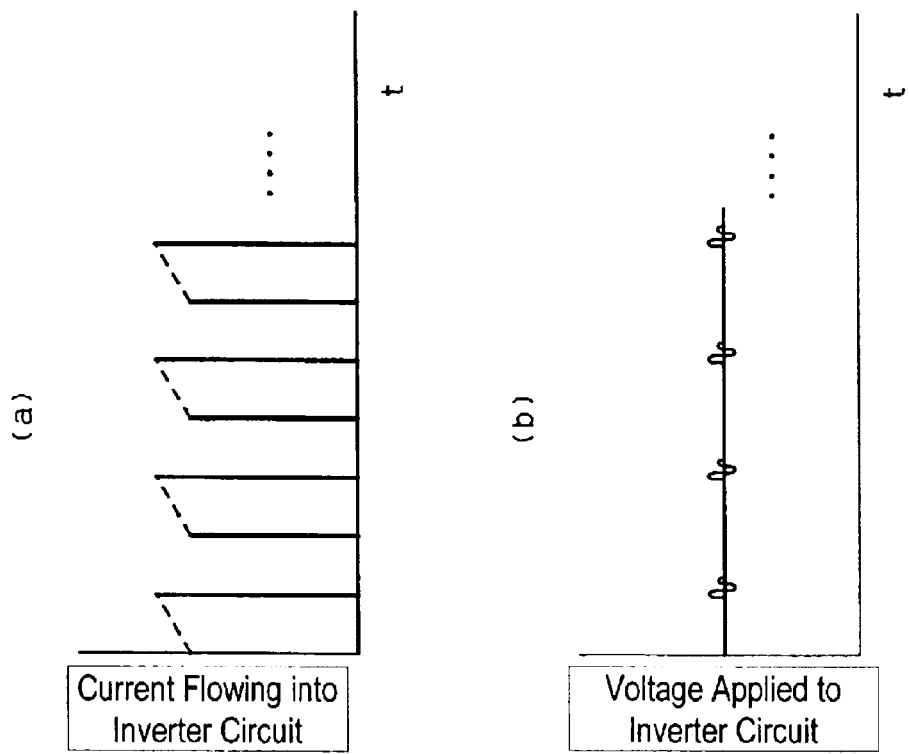
FIG. 7(a) shows a waveform of a current flowing into an inverter circuit of an electric compressor driving device in accordance with embodiment 2.
FIG. 7(b) shows a waveform of a voltage applied to the inverter circuit of the electric compressor driving device.

FIG. 7(a) shows a current flowing into inverter circuit 9. This current is similar to that of the conventional circuit.

FIG. 7(b) shows a voltage applied to inverter circuit 9. This voltage includes resonant voltages of a small peak value since film capacitor 28 resonates with the inductance of shield cable 29, thereby producing the resonant voltage instead of a steep surge voltage. This is different from the voltage shown in FIG. 21(c) and the voltage of embodiment 1 shown in FIG. 5(c). Thus, the surge voltage becomes small enough not to damage the circuit of compressor driving device 5.

When film capacitor 28 is installed to the circuit, a capacitance of the capacitor can be exactly specified since the inductance of the shield cable is specified. Therefore, the capacitance of film capacitor 28 may not be excessive larger than necessary, thereby allowing film capacity 28 to be small.

Current detecting resistor 42 is placed at the right side of film capacitor 28 in order to prevent a resonant current from flowing. Film capacitor 28 includes a dielectric material mainly of plastic film and an electrode of metal foil. The capacitance of the capacitor is smaller than that of an electrolytic capacitor; and has excellent high-frequency characteristics, which can absorb the surge voltage discussed above.

Film capacitor 28 can be replaced by a ceramic capacitor including a dielectric material mainly of ceramics and an electrode coated with metallic film. Both types of capacitors have vibration proof and heat proof better than those of the electrolytic capacitor because of their constructions.

The electrolytic capacitor may restore a voltage even after discharged. The compressor driving device equipped with electrolytic capacitor 41 generates a discharging spark between capacitors 41 and 3 when the power supply is connected. This phenomenon causes a fuse-blown or adversely affects the operation. According to embodiment 2, no electrolytic capacitor 41 is used, so that the driving device is free from this problem.

In this embodiment, an electrolytic capacitor is used as smoothing capacitor 3; however, it is not limited to the electrolytic capacitor.

(Exemplary Embodiment 3)

Figure 9:
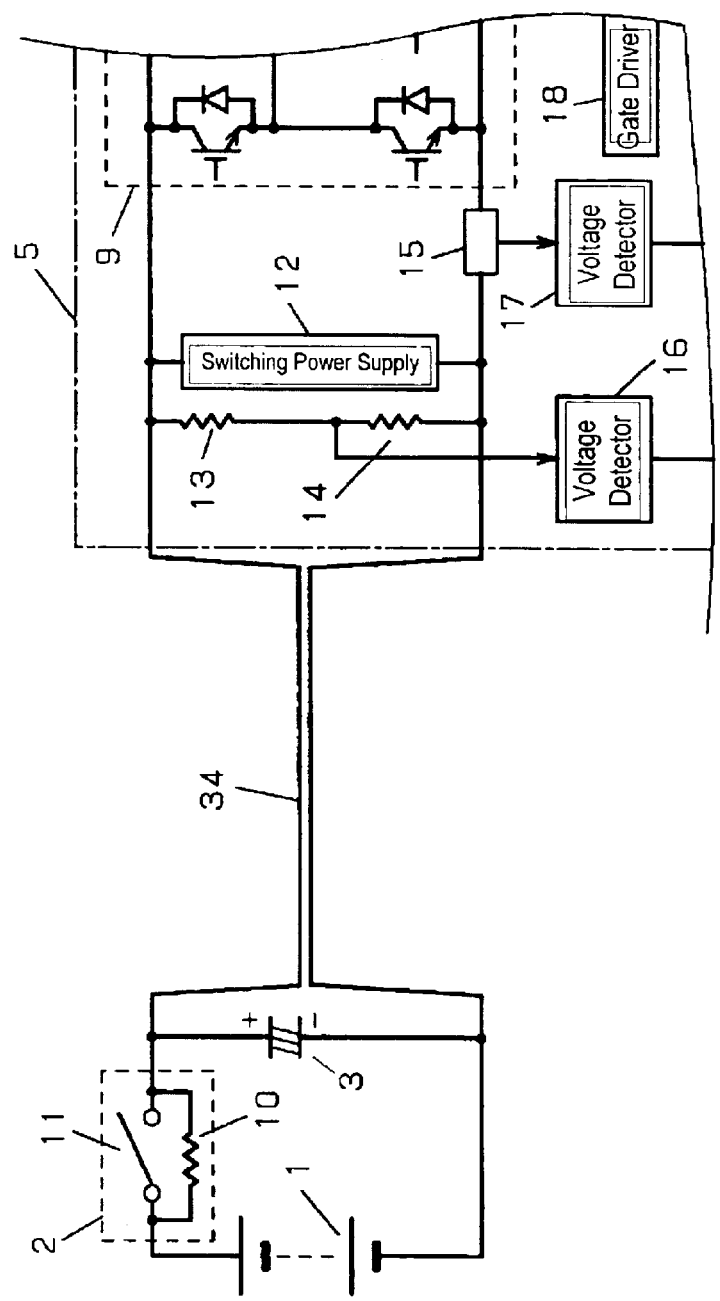
FIG. 9 is a circuit diagram of an essential part of an air-conditioner in accordance with exemplary embodiment 3 of the invention.
Figure 10:
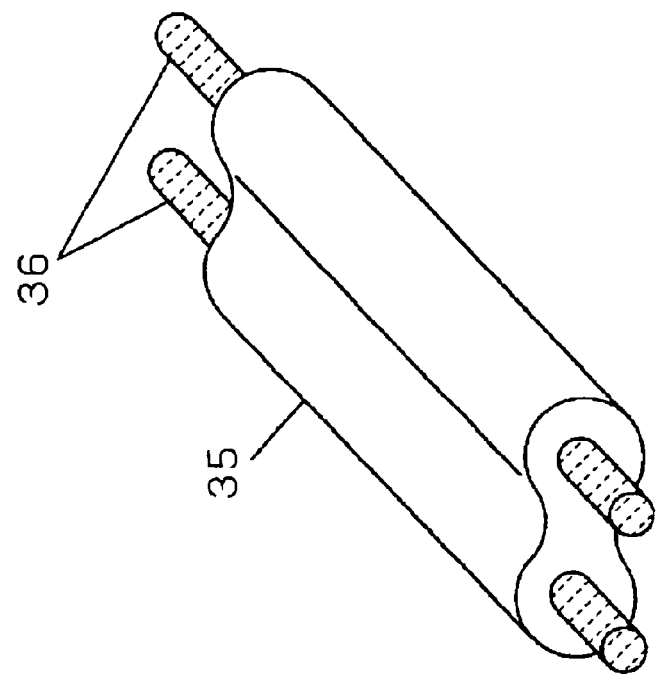
FIG. 10 shows a construction of a parallel-line cable used in the circuit.

FIG. 9 shows a circuit diagram of electric compressor driving device in accordance with exemplary embodiment 3 of the present invention. A power supply lead wire employs parallel-line cable 34. This is a different point from the circuit shown in FIG. 1. FIG. 10 shows a configuration of parallel-line cable 34 shown in FIG. 9.

In parallel-line cable 34, two conductors 36 are parallel with resin 35 that is flexible and electrically insulating. It is not limited to this shape, but two conductors may be applied with a tape or extend through a vinyl tube for forming the parallel-line cable. As shown in FIG. 3, the parallel-line cable have a small inductance, but the inductance is larger than that of a shield cable. In the parallel-line cable, a distance between the two conductors is kept constant, so that the inductance is also kept constant. Thus, a reliable design is achievable because since the inductance can be specified. The parallel-line cable provides better workability than the two lead wires, and the parallel-line cable can be terminated easier than the shield cable.

(Exemplary Embodiment 4)

Figure 11:
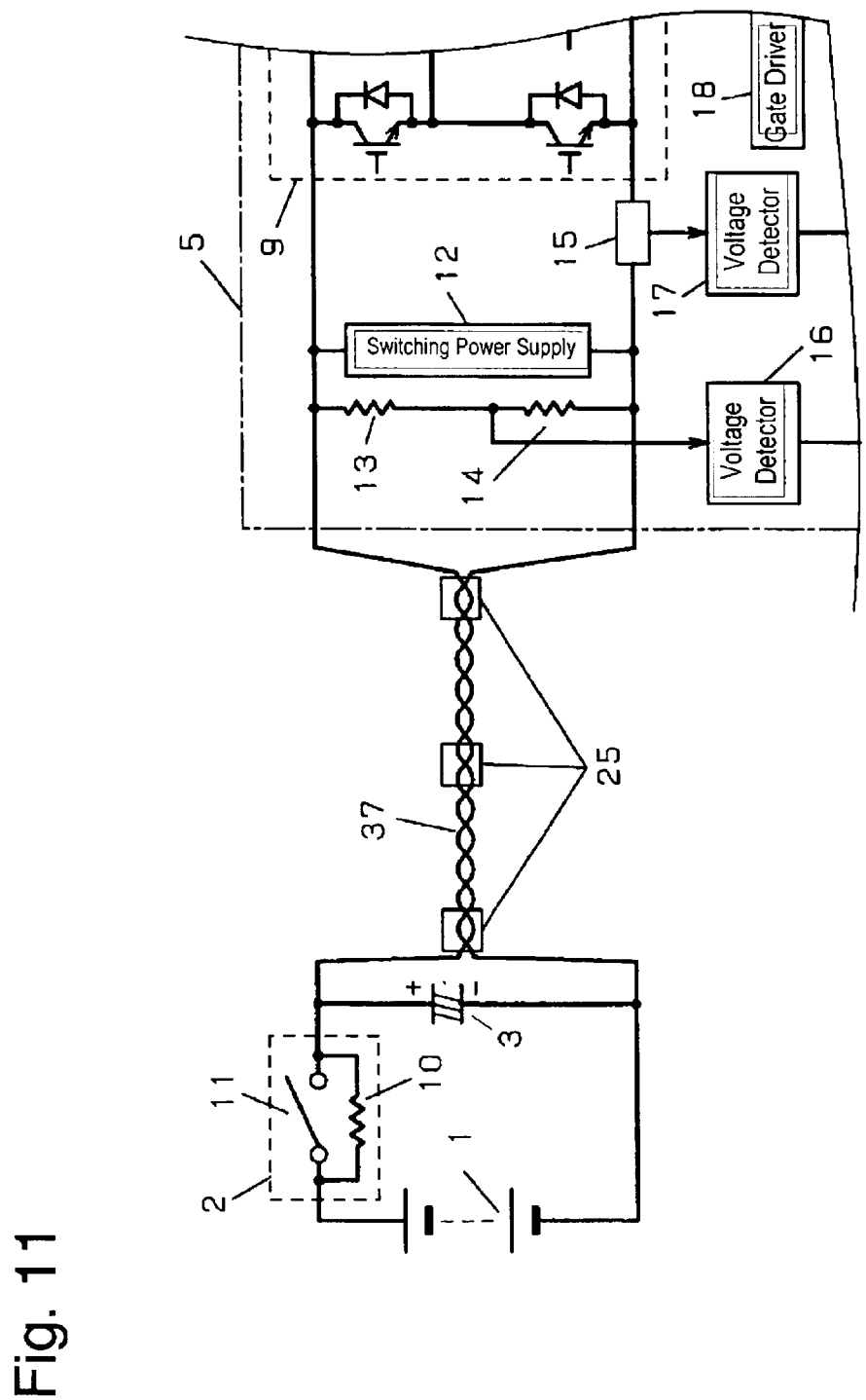
FIG. 11 is a circuit diagram of an essential part of an air-conditioner in accordance with exemplary embodiment 4 of the invention.

FIG. 11 shows a circuit diagram of an electric compressor driving device. A power supply lead wire employs a twisted-pair cable 37, which is different from the cable of the circuit shown in FIG. 1. Two lead wires are twisted and fixed by tape 25.

As shown in FIG. 3, the twisted-pair cable has the same inductance as that of the parallel-line cable. The twisted-pair cable includes two lead wires twisted, so that the distance between the two lead wires is kept constant, thereby having an inductance specified and allowing a reliable design. The twisted-pair cable can be formed by just twisting lead wires, so that the twisted-pair cable may be fabricated easier than the shield cable or the parallel-line cable.

(Exemplary Embodiment 5)

Figure 12:
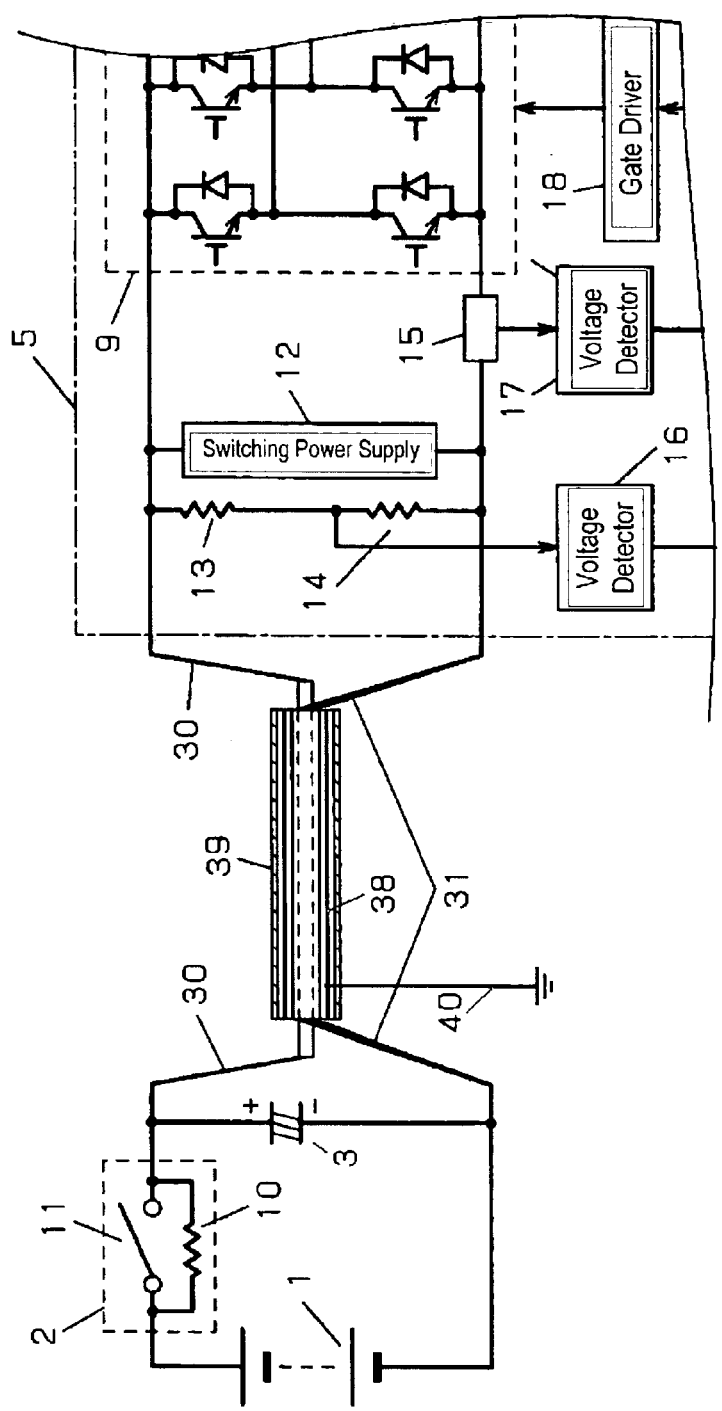
FIG. 12 is a circuit diagram of an essential part of an air conditioner in accordance with exemplary embodiment 5 of the invention.
Figure 13:
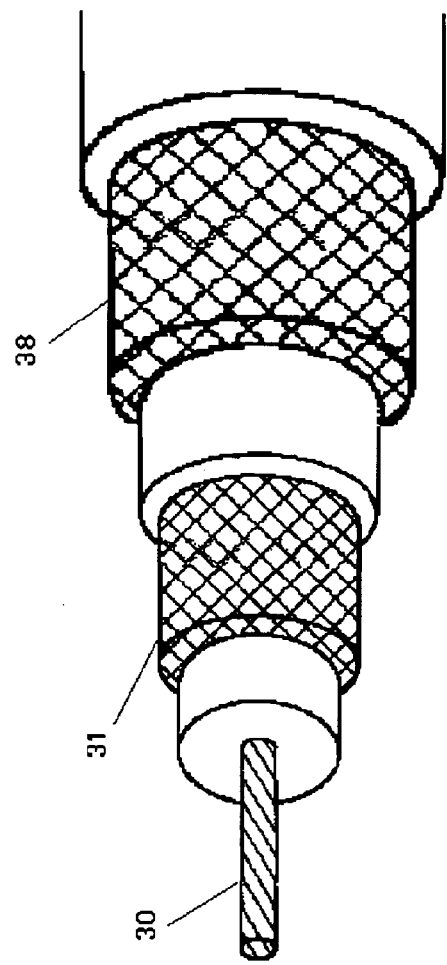
FIG. 13 shows a construction of a double shield cable used in the circuit.

FIG. 12 shows a circuit diagram of an electric compressor driving device employing double-shield cable 39. FIG. 13 shows a configuration of double-shield cable 39.

Instead of shield cable 29 employed in the circuit of the driving device shown in FIG. 1, double-shield cable 39 is used. Outer most conductor 38 is grounded to a car body via grounding wire 40.

This cable is used for suppressing electromagnetic-wave radiation caused by a potential difference between a ground of the car body and a power supply system of battery 1. A single shield cable can only cancel magnetic fields caused by currents, but cannot suppress the electromagnetic-wave radiation. Outer most conductor 38 is thus grounded to the car-body, thereby shielding the electromagnetic-wave radiation.

Parallel-lines cable 34 shown in FIG. 9 and twisted-pair cable 37 may be provided with a shield cover for covering the cables, and the cover may be grounded.

(Exemplary Embodiment 6)

Figure 14:
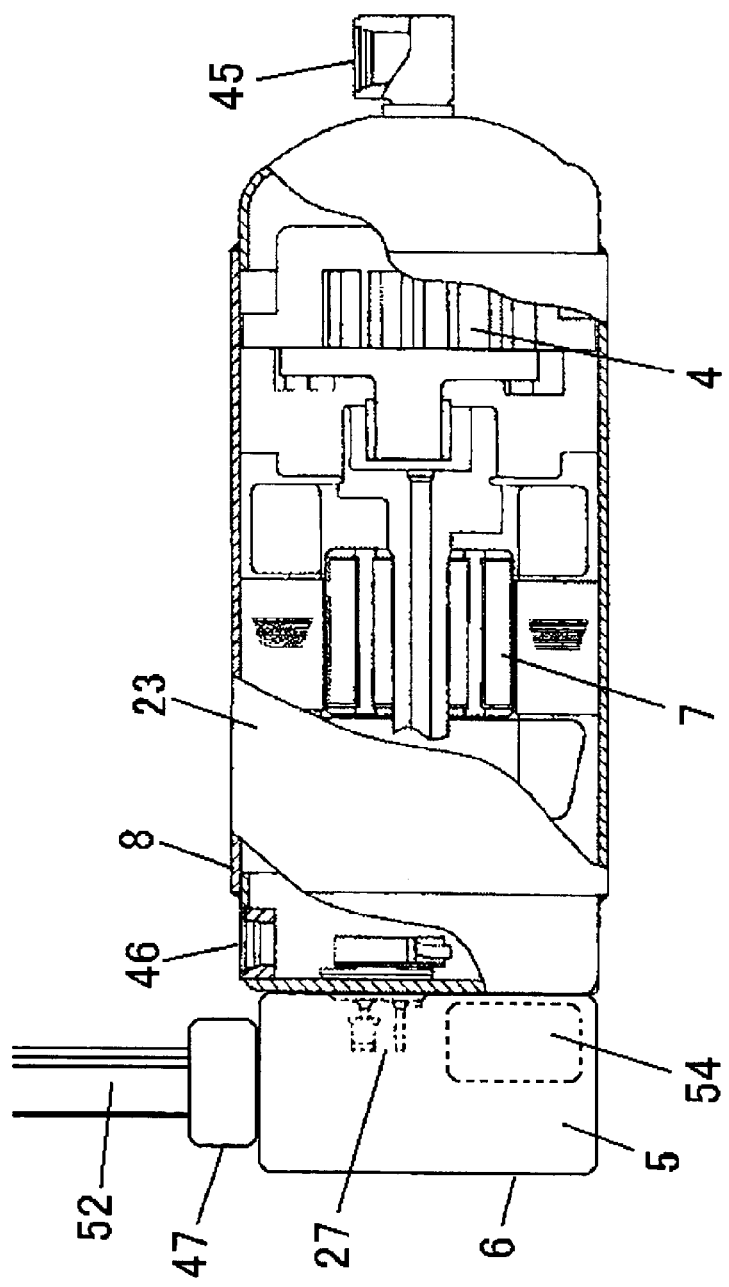
FIG. 14 shows a partial cut-away front view of an electric compressor incorporating a driving device of the air conditioner.
Figure 19:
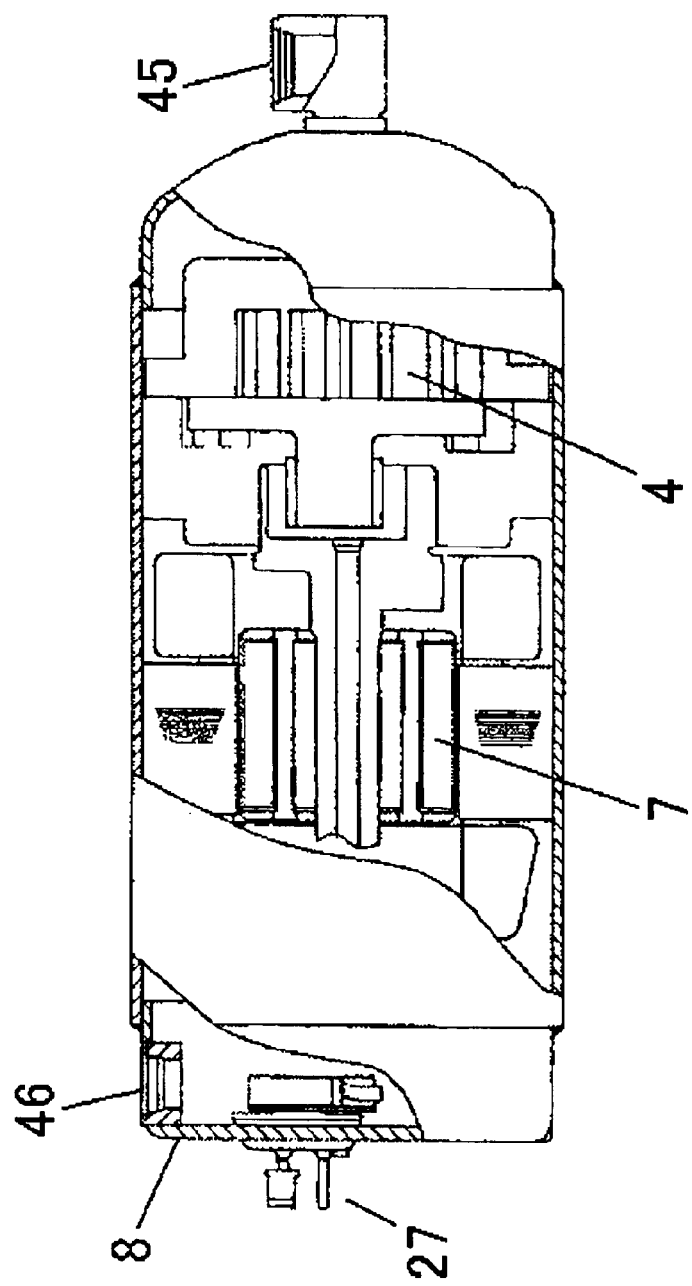
FIG. 19 shows a partial cut-away front view of a conventional electric compressor.
Figure 20:
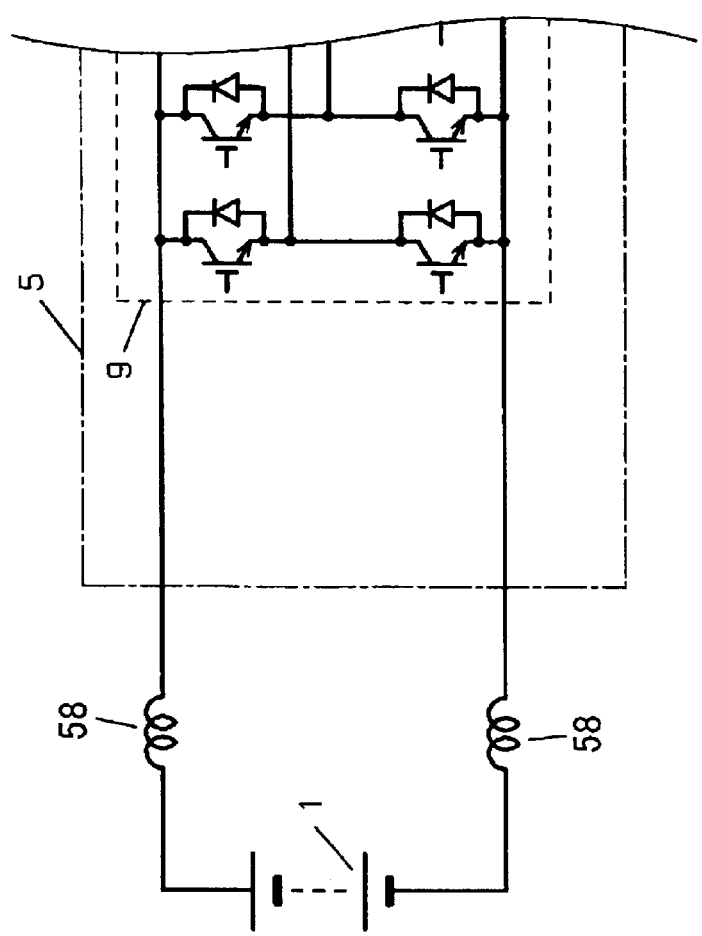
FIG. 20 is a circuit diagram excluding a smoothing electrolytic capacitor of the electric compressor driving device, and indicating an inductance component.

FIG. 14 illustrates compressor driving device 5 installed to closely contact the left side of electric compressor 23. Compressor 23 has a basic configuration identical to that used in the conventional air conditionaer shown in FIG. 19.

Figure 4:
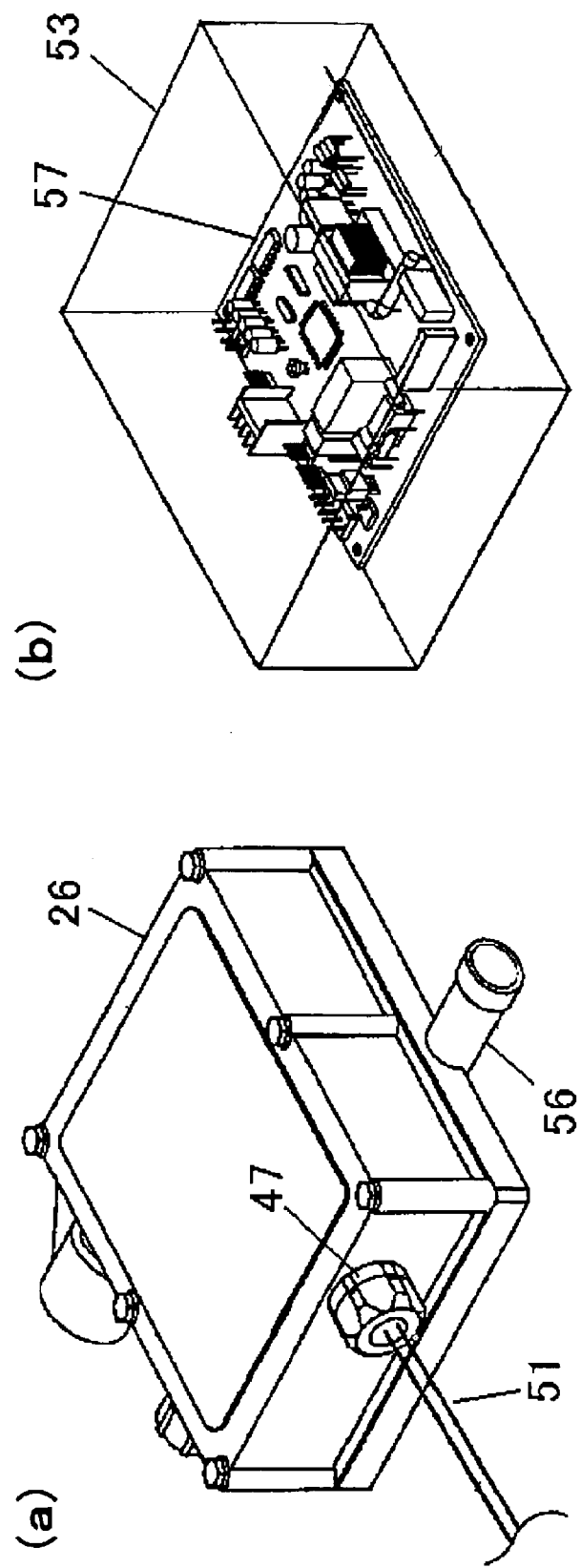
FIG. 4(a) shows a perspective view illustrating the appearance of an electric compressor driving device of the air-conditioner.
FIG. 4(b) shows a perspective view illustrating the inside of the electric compressor driving device.

Case 6 of driving device 5 is modified from case 26 shown in FIG. 4 so that driving device can be mounted to compressor 23. Inverter block 54, i.e., a heat source, dissipates heat to metal case 8 of compressor 23 via case 6.

Terminal 27 is coupled to an output section of inverter block 54. Since compressor driving device 5 is not equipped with electrolytic capacitor 41, device 5 can be small and free from restriction due to the shape of capacitor 41, so that driving device 5 can be modified easily to be mounted to compressor 23.

Electrolytic capacitor 41 is vulnerable to vibration, and has a life varying according to heat. The compressor without capacitor 41 allows driving-device 5 to have less countermeasures (vibration proof and heat proof construction) against vibration and heat delivered from compressor 23.

Coupling wires 52 include one shield cable to battery 1, three wires carrying control signals to an air-conditioner controller. Switching power supply 12 installed in driving device 5 can produce 12V, so that two power-supply lead wires necessary for a 12V power supply are omitted.

Inverter block 54 is cooled with refrigerant in compressor 23 via metal case 8, however, it can be cooled by a construction, such as water cooling or air cooling. Compressor 23 should be placed around a tube in which the refrigerant flows, so that compressor 23 is obliged to be away from battery 1, however, a small inductance of shield cable 29 enables the compressor to be place at this position.

INDUSTRIAL APPLICABILITY

As described, a center conductor and an outer conductor of a shield cable are used for supplying a power to an electric-compressor driving device from a direct-current (DC) power supply. The center and outer conductors allows the driving device to suppress surge voltages and electromagnetic-wave radiation even without a smoothing capacitor which smoothes a power current, thus providing an air conditioner including a compact and light-weighted compressor driving device.

In addition to the above construction, double outer conductors are prepared in the shield cable, and the outer most conductor is used for shielding electromagnetic wave. This construction suppresses electromagnetic-wave radiation caused by an electric potential difference between a grounding of a power supply system and a grounding of a car body.

In addition to the foregoing construction, the driving device is mounted to the compressor, so that an electrolytic capacitor can be omitted from the driving device. Thus, the driving device is free from restrictions on the reliability and the service life caused by vibrations of the driving motor of the compressor and heat generated by compressing the refrigerant. As a result, the compressor driving device can be small and free from restriction of the size of the electrolytic capacitor (capacitor for smoothing a power current).

The foregoing construction allows a circuit board to be modified in shape easily, so that the driving device can be mounted to the compressor. This structure can omit lead wires between the driving device and the compressor, and omit a cooling structure (such as water cooling or air cooling) by dissipating heat to the refrigerant. This structure further reduces the size and weight of the driving device.

What is claimed is:

1. An air conditioner comprising:

a direct current (DC) power supply;

an electric compressor;

an electric-compressor driving device for converting a current supplied from said DC power supply to an alternate-current (AC) current for driving said electric compressor; and at least two conductors for supplying said current from said DC power supply to said electric-compressor driving device, said at least two conductors being distanced from each other at a constant interval, one of said at least two conductors having an inductance per a length of 1 m of 0.6 $\mu$H at frequencies ranging from 1 kHz to 100 kHz.

2. The air conditioner according to claim 1, wherein said at least two conductors comprise a shield cable including a center conductor corresponding to said one of said at least two conductors, and a first outer conductor provided around said center conductor and corresponding to other of said at least two conductors.

3. The air conditioner of claim 2, wherein said shield cable further includes a second outer conductor provided around said first outer conductor for shielding an electromagnetic wave.

4. The air conditioner according to claim 1, wherein said at least two conductors comprise one of a parallel-line cable and a twisted-pair cable.

5. The air conditioner of claim 2, wherein said electric-compressor driving device is mounted to said compressor.

6. The air conditioner of claim 2, wherein said electric-compressor driving device includes an inverter circuit, and no current smoothing capacitor is provided at a power supply side of said inverter circuit included in said electric-compressor driving device.

7. The air conditioner of claim 5, wherein said electric-compressor driving device includes an inverter circuit, and no current smoothing capacitor is provided at a power supply side of said inverter circuit included in said electric-compressor driving device.

8. The air conditioner of claim 3, wherein said electric-compressor driving device is mounted to said compressor.

9. The air conditioner of claim 4, wherein said electric-compressor driving device is mounted to said compressor.

10. The air conditioner of claim 3, wherein said electric-compressor driving device includes an inverter circuit, and no current smoothing capacitor is provided at a power supply side of said inverter circuit included in said electric-compressor driving device.

11. The air conditioner of claim 4, wherein said electric-compressor driving device includes an inverter circuit, and no current smoothing capacitor is provided at a power supply side of said inverter circuit included in said electric-compressor driving device.

12. The air conditioner of 1, wherein said at leat two conductors are located close to each other.

13. The air conditioner of claim 1, wherein currents flow in directions opposite each other in said at leat two conductors, respectively.

* * * * *